United States Patent [19]

Rice

[11] Patent Number: 4,859,718

[45] Date of Patent: Aug. 22, 1989

[54] METHOD FOR SURFACE TREATING METAL CARBONATE

[75] Inventor: Camilla A. Rice, Sandersville, Ga.

[73] Assignee: E.C.C. America Inc., Atlanta, Ga.

[21] Appl. No.: 175,868

[22] Filed: Mar. 31, 1988

Related U.S. Application Data

[63] Continuation-in-part of Ser. No. 943,669, Dec. 17, 1986, Pat. No. 4,789,403, which is a continuation-in-part of Ser. No. 887,320, Jul. 22, 1986, abandoned.

[51] Int. Cl.$^4$ .......................... C08K 9/04; C08K 3/26
[52] U.S. Cl. ..................... 523/202; 523/205; 427/221; 427/213; 428/407
[58] Field of Search ............... 523/205, 202; 106/308 N, 308 M, 309, 308 Q, 465; 428/407; 427/221, 213

[56] References Cited

U.S. PATENT DOCUMENTS

| | | | |
|---|---|---|---|
| 3,471,439 | 10/1969 | Bixler et al. | 523/202 |
| 3,763,084 | 10/1973 | Grudus et al. | 523/205 |
| 3,773,708 | 11/1973 | Takahashi et al. | 523/205 |
| 4,196,012 | 4/1980 | Windle | 523/205 |
| 4,248,765 | 2/1981 | Patil et al. | 523/205 |

*Primary Examiner*—Lewis T. Jacobs
*Attorney, Agent, or Firm*—Klauber & Jackson

[57] ABSTRACT

A method of producing a calcium carbonate, magnesium carbonate or calcium-magnesium carbonate which is surface modified with an organic material wherein the carbonate in substantially dry, particulate form is contacted with an organic monomer, copolymers or a prepolymer, and surface polymerization or reaction in situ on the carbonate in the presence of a gaseous hydrogen atmosphere is effected. In the case where the carbonate has been wet processed and residues of a dispersing agent employed remain as a coating on the carbonate particles after drying, a minor amount of a calcined kaolin or $TiO_2$ is used as a polymerization catalyst. When the carbonate has been dry ground so that the particles are free from processing chemicals, no catalyst is needed to initiate the polymerization.

17 Claims, 2 Drawing Sheets

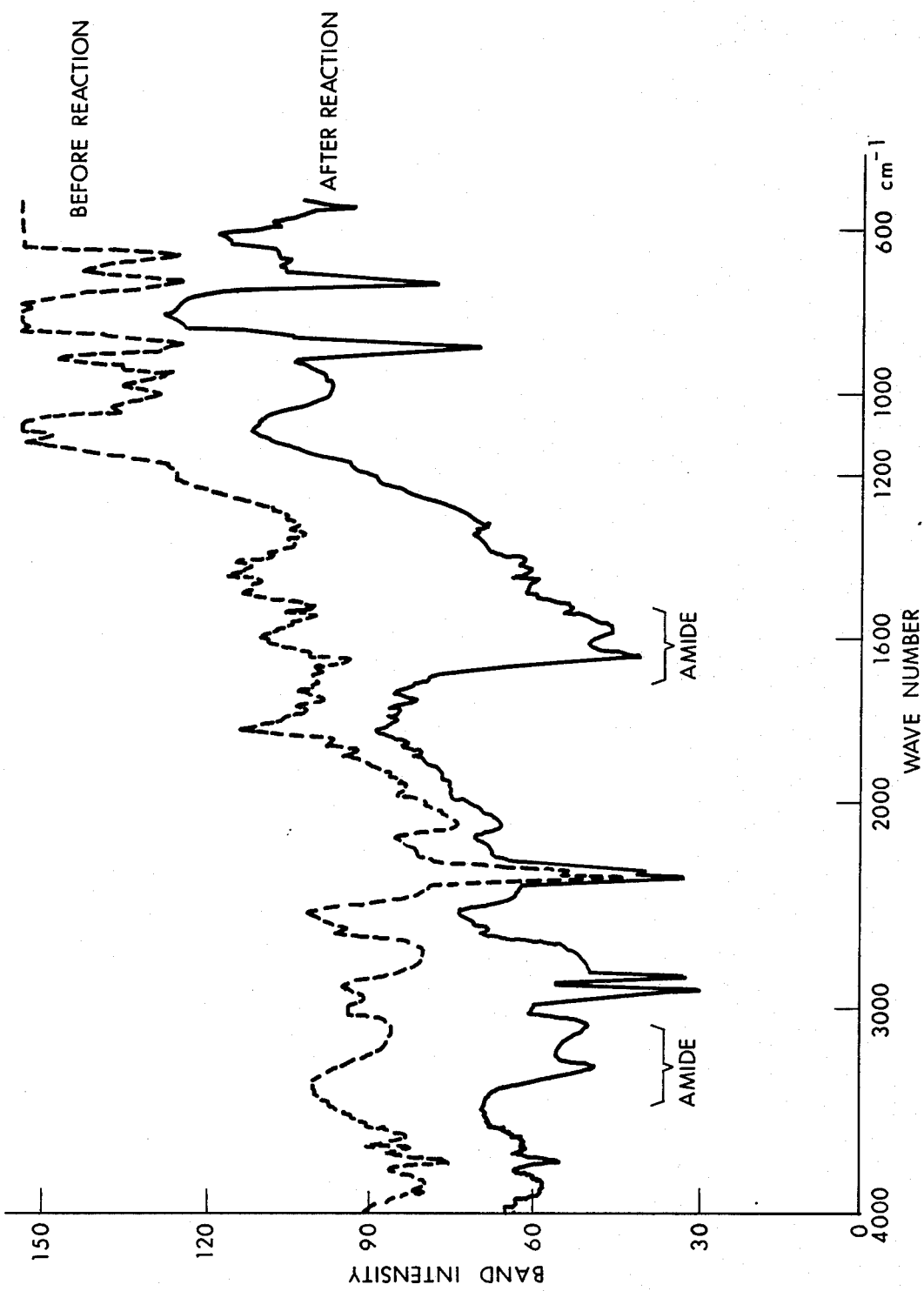

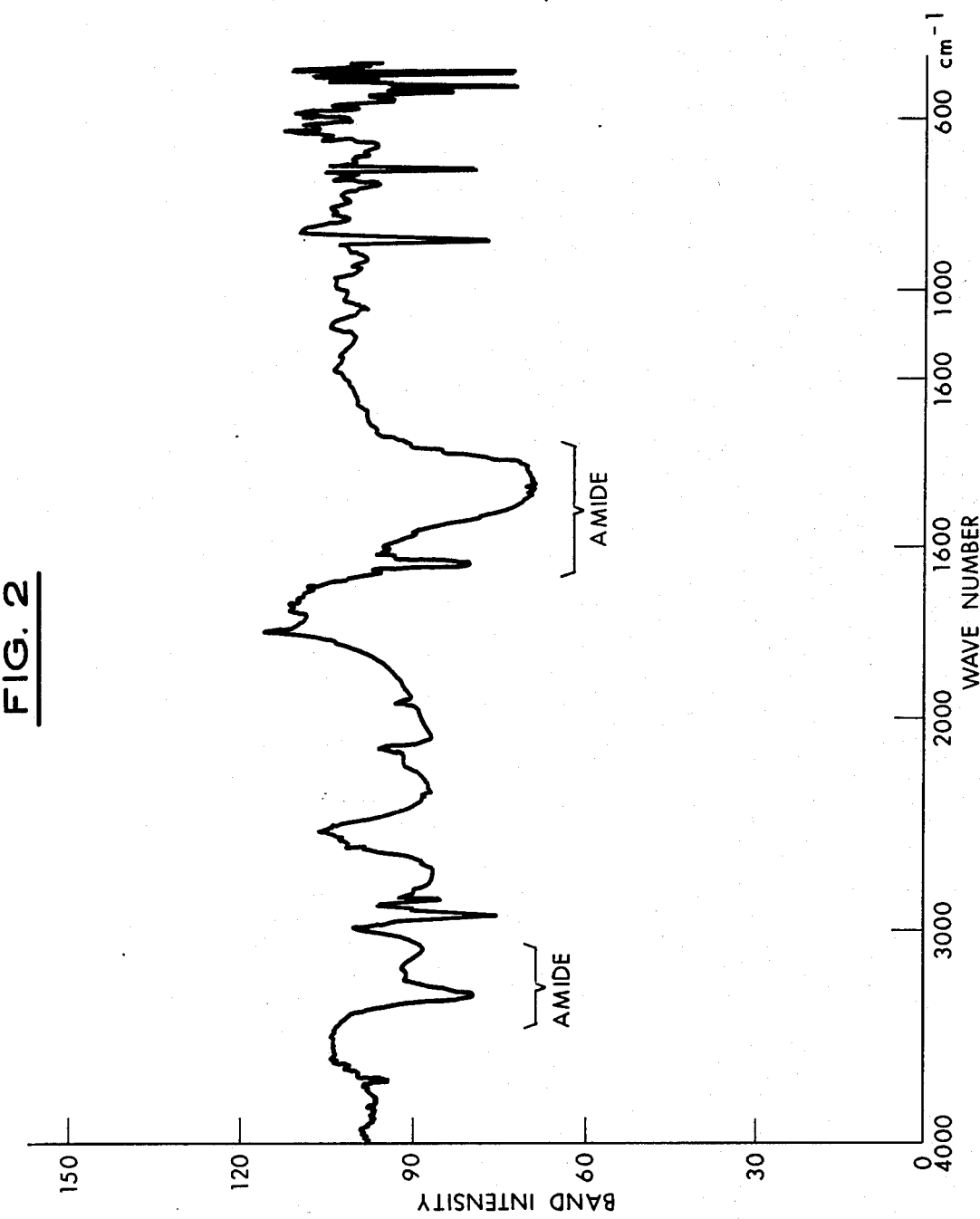

METHOD FOR SURFACE TREATING METAL CARBONATE

This application is a continuation-in-part of U.S. Ser. No. 943,669 filed Dec. 17, 1986, now U.S. Pat. No. 4,789,403, which in turn is a continuation-in-part of U.S. Ser. No. 887,320 filed July 22, 1986, now abandoned.

FIELD OF THE INVENTION

This invention relates to the surface treatment of carbonates, in particular metal carbonates of Group II A, e.g., calcium carbonate, magnesium carbonate and dolomite, to make them useful as reinforcing fillers in plastic, rubber and resin systems. The metal carbonate may be dry processed, i.e., dry ground and chemical-free; or it may have been processed via a wet route, e.g., by dispersing the carbonate in water using dispersants such as polyacrylates and grinding the slurry so obtained.

A relatively simple, inexpensive process to modify a carbonate surface in a dry state to render the surface more compatible with organic matrices in which it is used as a filler, is disclosed.

BACKGROUND OF THE INVENTION

According to GB No. 2,131,435A, synthetic elastomers, e.g., ethylenepropylene terpolymers (EPDM), styrene-butadine rubber (SBR), and butyl and nitrile rubbers, find widespread use, for instance in sealants, gaskets, conveyor belts and electrical cable insulation. In many of these applications they are preferred to natural rubber because of their superior resistance to degradation by heat, oils, solvents, oxygen and ozone.

Most synthetic elastomers belong to the non-crystallyzing category and, unlike natural rubber, their gum strength is poor. Useful mechanical properties can be achieved, however, by the addition of a particulate filler that improves the modulus and failure properties of the cured vulcanisate. This phenomenon is known as reinforcement and is associated with an increase in modulus, tensile strength and swelling resistance. Significant reinforcement is, in general, manifested only when the filler particles have a high surface area and the elastomer wets the filler.

Hitherto the most important and commonly used reinforcing filler has been carbon black. The so-called structured or reinforcing grades of carbon black are prepared from relatively expensive hydrocarbon feedstocks such as the aromatic fraction of petroleum or natural gas by burning in an oxygen-depleted atmosphere in special furnaces. Moreover, these feedstocks are in demand for the production of monomers (e.g styrene) and other chemicals. Consequently, because of the competition for these limited hydrocarbon feedstocks, the cost of carbon black has tended to rise steeply. The search for cheaper alternatives to carbon black as a filler has thus been stimulated by the increasing costs of that material.

Synthetic calcium carbonates have attracted interest since their very small ultimate particle size suggests that they may be capable of providing a high degree of reinforcement in elastomer compositions. One advantage of these calcium carbonates is that they can be manufactured by processes that are not high consumers of energy and that involve raw materials of low cost. Thus, synthetic calcium carbonate of high surface area and of regulated particle size, shape and distribution and crystal structure can be prepared by the carbonation of an aqueous lime suspension. Another advantage is that the use of calcium carbonate as a filler permits the production of colored or white elastomer composites.

However, as further discussed in GB No. 2,131,435A, in order to achieve adequate reinforcement, there should be a strong interaction between the surface of the filler particles and the elastomer, leading to adhesion. Because of the hydrophilic nature of the surface of precipitated calcium carbonates (in contrast to carbon black) adhesion at the filler/elastomer interface is poor.

The surface treatment of precipitated calcium carbonate using stearic acid has been practiced for many years. Although such a treatment increases the hydrophobicity of the calcium carbonate surface, the improvement in adhesion at the filler/elastomer interface is not significant and the performance characteristics of stearate-coated grades of precipitated calcium carbonate as rubber-reinforcing fillers are only modest.

In Canadian patent No. 1,110,504 issued to Imperial Chemical Industries, it is disclosed that the compatibility of a basic particulate filler with an organic polymer can be improved by coating the filler with an organic polymer which contains at least one unsaturated group and a carboxylic acid or carboxylic anhydride group. Such coated fillers are stated to be especially useful as fillers in natural or synthetic rubbers. The filler may be prepared by mixing a suspension of precipitated calcium carbonate with the triethylammonium salt of the methyl half-ester of a polybutadiene-maleic anhydride adduct.

In U.S. Ser. No. 943,669 filed Dec. 17, 1986, the preparation is described of a filler, useful in polymer systems, wherein a layered lattice silicate such as kaolin in substantially dry, particulate form is contacted with an organic monomer, co-monomers or a prepolymer, in the presence of gaseous hydrogen. Surface polymerization or reaction in situ on the silicate takes place and it was found that with the use of hydrogen, strong bonding of modifier to the silicate surface is achieved.

In Iannicelli U.S. Pat. No. 3,567,680 a finely divided particulate inorganic reinforcing filler pigment for use in elastomers is disclosed consisting essentially of kaolin clay surface modified with a mercaptoorganosilane, e.g., mercaptopropyltrimethoxysilane. See also Papalos U.S. Pat. No. 3,227,675. The present invention, however, avoids the use of the expensive organosilanes.

Kamagaito et al U.S. Pat. No. 4,472,538 again uses a silane compound. A composite material is provided by contacting a clay mineral having laminated aluminum silicate layers with an organic monomer to allow the organic monomer to be adsorbed on or intercalated between the aluminum silicate layers, and contacting the clay mineral with a silane compound having 2 to 4 chlorine atoms such as dichlorodimethylsilane to promote polymerization of the organic monomer, thereby forming a composite material composed of a clay mineral having an organic high polymer absorbed thereon or intercalated therebetween. The monomer may be a vinyl monomer such as styrene, isoprene or vinyl acetate. Example 2 shows use of E-caprolactam as the monomer and use of the product in a nylon 6,6 matrix.

Takahashi et al in U.S. Pat. No. 3,773,708 describe a method for forming a filler resin or rubber composition which comprises crushing an inorganic filler wherein the filler is reduced in size by an average of more than 10 times the original diameter in the presence of a free radical polymerizable or ionic polymerizable monomer whereby the monomer is polymerized and is bonded to the newly formed surfaces of the crushed filler to form a modified filler, and admixing said modified filler into a matrix of a thermoplastic resin, thermosetting setting resin or rubber. The patentees use a crushing technique to form new surfaces that help to initiate polymerization via free radical or ionic polymerization. They recite that mechanical crushing of the inorganic filler will result in exposing of newly formed surfaces which will momentarily contain active radicals or ions due to the shear and impact forces which break chemical bonds in the particle. On the other hand, the process of the present invention gives controlled reaction on each particle at the desired particle size distribution for a particular application. Therefore, these is substantially no change in the initial particle size distribution of the mineral during the process.

As described in Canadian patent No. 1,119,142 issued to Anglo-American Clays Corp., naturally occurring calcium carbonate is found in natural calcite deposits that are highly contaminated with discolorants which contribute to the discoloration of the otherwise relatively colorless calcium carbonate. These contaminants may include pyrites, mica and siliceous materials, e.g., sand and quartz. The process of the patent for producing a high brightness particulate calcium carbonate comprises in sequence the steps of coarse-milling the natural calcitic ore; subjecting the coarse-milled product as an aqueous slurry including less than 40% solids to a froth flotation, and separating with the froth discoloring contaminants; dewatering the underflow product from the froth flotation to at least 60% solids by weight; and wet-milling the dewatered product to an output product of a specified E.S.D. (equivalent spherical diameter) and brightness. This patent indicates what is meant by the term "wet processing" or "wet grinding". In Example I a sample of curshed ore was "wet ground" in slurry form at 65% solids by use of a ball mill to provide particulate material of a certain E.S.D. A dispersing agent was used during ball milling in order to facilitate grinding - in this example Dispex N40, a trademark for a sodium polyacrylate composition, was used as a dispersant. By contrast, a dry ground or dry processed carbonate is one which has been ground in dry condition without the use of dispersants.

U.S. Pat. No. 3,604,634 is further elucidative of dry ground and of wet processed calcium carbonates. The dispersing agents sold under the trademark Dispex include the sodium, potassium and ammonium salts of polyacrylic acids and of polymethacrylic acids.

According to the invention, in the modification of a substrate filler material such as a calcium carbonate by surface treatment thereof with a polymerizable material, e.g., a monomer, co-monomers or a prepolymer, the presence of a flowing gas containing hydrogen activates the surface and makes it reactive towards the polymerizable species. However, in one aspect of the invention, when the carbonate has been subjected to wet processing,, i.e., has been ground in an aqueous slurry containing a dispersing agent, a problem that arises is that the dispersing agent covers the active sites resulting from the use of hydrogen and renders the carbonate inactive. The solution of this problem is an object of the invention.

SUMMARY OF THE INVENTION

In one aspect, the invention relates to a method of producing—and the product thereof—a carbonate selected from the class consisting of calcium carbonate, magnesium carbonate and calcium-magnesium carbonate, which is surface modified with an organic material, wherein the carbonate in substantially dry, particulate form and which has been dry ground is contacted with an organic monomer, co-monomers, or a prepolymer, in the presence of gaseous hydrogen. The hydrogen need not be pure and may contain inert constituents. No catalyst is needed, since the active sites generated by the hydrogen are not covered or impeded by residual chemicals as can result from wet processing. The product is a carbonate which is surface bound to the polymerized organic. For example it may be a nylon modified carbonate.

In another aspect, the invention relates to a method—and the product thereof—which is similar to the above except that the carbonate has been subjected to wet processing, viz., the carbonate has been ground as an aqueous slurry containing a dispersant. In this case an initiation catalyst is needed during the activation with hydrogen gas, which comprises a polymerization initiating amount, viz., a minor amount, generally less than 1%, e.g., of the order of 0.25 to 0.5 weight percent based on the weight of the carbonate on a dry basis, of a calcined kaolin or titanium dioxide, the calcined kaolin being preferred.

A large variety of organic monomers may be used in the process of the invention; for example E-caprolactum or alternatively 6-amino caproic acid, to produce nylon 6; hexamethylenediammonium adipate or the co-monomers hexamethylene diamine and adipic acid, to form nylon 6,6; the corresponding monomer from hexamethylene diamine and sebacic acid or the co-monomers, to form nylon 6,10; and the lactam of heptanoic acid to form nylon 7. It will be apparent that other monomers, co-monomers or prepolymers may be used to produce various nylon types. In addition, other types of prepolymers e.g., ABS (acrylonitrile/butadiene/styrene) prepolymer, polybutadiene, polypropylene, polyethylene, are capable of being reacted in situ on the carbonate, to make the latter useful as fillers for polymer matrices, in particular matrices of the same polymer as that deposited on the carbonate particles. Similarly, the in situ formed polymer need not be identical to the matrix polymer, provided that the two are compatible. It is believed that the polyamide (nylon) type polymers grow from the surface of the carbonate which results from the exposure of the carbonate surface to nylon type monomers/prepolymers; and that in the case of the other resins (ABS prepolymer, polybutadiene, polypropylene, polyethylene) the polymer resin is exposed to the mineral surface and becomes bonded to it.

Thus, the invention includes the in situ synthesis of polymers on a carbonate surface with the primary, i.e., first layers being surface bonded; and as a product, a particulate carbonate the surfaces of which are modified by the in situ synthesized polymer.

The invention is also directed to a composition comprising a filled polymer system comprising a matrix polymer and a filler modified as described above. The surface-modified products of the present invention are particularly useful as fillers in plastic, rubber and resin systems and the like, wherein by virtue of their unique compatibility enabled with such systems, excellent mechanical, thermal and other properties are obtained in the thereby filled systems.

Thus the invention includes the treatment of chemically processed carbonates or dry processed carbonates with nylon precursors to form N6, N6,6, N11, etc. Useful conditions include a treating temperature range of generally 150° to 275° C. and a flow rate of $H_2$ of at least 5 SCFH (standard cubic feet per hour). A rotary furnace, fluidized bed or similar apparatus may be used to insure good solids—gas contact. The level of addition of the monomers/prepolymers may suitably be in the range of about 0.5 weight percent to about 10 weight percent based on the weight of the carbonate. Typical reaction times are from about 5 to 45 minutes, depending upon concentration and composition of the reactants and temperature, although longer reaction times can be utilized.

BRIEF DESCRIPTION OF THE DRAWINGS

FIG. 1 shows the infrared drift spectra obtained in connection with Example 1 before and after the reaction and showing amide bond formation; and FIG. 2 shows the infrared drift spectra obtained for the product of Example 3.

DETAILED DESCRIPTION

The invention will be described in connection with the following examples which are intended to be illustrative and not limitative.

In connection with the Examples, certain compounds with their formulas, which are interrelated, are shown below:

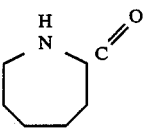

| adipic acid | $HO-C(CH_2)_4COOH$ (with =O) |
| 6-amino caproic acid | $NH_2(CH_2)_5C-OH$ (with =O) |
| E-caprolactum | (7-membered ring with NH and C=O) |
| nylon 6 | $H\text{-}[NH(CH_2)_5CO]_n\text{-}OH$ |
| nylon 6,6 | $H\text{-}[NH(CH_2)_6NHCO(CH_2)_4CO]_n\text{-}OH$ |

EXAMPLE 1

A 500 gram sample of dried French dolomite containing 6.5 weight % magnesium, which had been wet processed, was milled one time in a micropulverizer with 2 wt. % 11-aminoundecanoic acid and 0.5 wt. % Catex, a calcined kaolin manufactured by the Anglo-American Clays Corp. of Sandersville, Ga., U.S.A., based on the weight of the dolomite. The mixed sample was treated in a fluidized bed reactor heated to 200° C. in a hydrogen atmosphere, the flow rate of which was maintained at 15 SCFH, for 30 minutes. The IR spectra of the cooled reacted material showed the development of amide bonds. FIG. 1 exhibits the spectra before (upper) and after (lower) reaction. The drift infrared spectra were obtained using a Perkin-Elmer 1710, infrared spectrophotometer fitted with a diffuse reflectance attachment.

EXAMPLE 2

Another 500 gram sample of the water processed French dolomite of Example 1 was milled one time in a micropulverizer with 2 wt. % 11-aminoundecanoic acid. It was processed in a fluidized bed reactor heated to 200° C. in a hydrogen atmosphere as described in Example 1. After the product had reacted for 30 minutes it was cooled to room temperature and removed from the reactor. An infrared drift spectra was obtained on reacted and unreacted products. No infrared bands, due to the presence of amide bonds had developed as a result of any polymerizate of the 11-aminoundecanoic acid on the dolomite surface. There was no reaction.

This example demonstrates the necessity of the calcined kaolin in the surface treatment of this wet processed dolomite via the present process.

EXAMPLE 3

500 grams of dried Micro-White 50, a dry ground calcium carbonate ground from pure white marble, available from Sylacauga Calcium Products of Sylacauga, Ala., U.S.A., was milled with 5 wt. % 11-aminoundecanoic acid based on the weight of the dry carbonate. The material was processed in a rotary furnace in a hydrogen atmosphere with a hydrogen flow rate of 15 SCFH at 200° C. for 35 minutes. The drift spectra of the reacted product as shown in FIG. 2 exhibited the formation of amide bonds upon reaction. No catalyst was needed with the dry ground calcium carbanate the surface of which was not coated with processing chemicals.

EXAMPLE 4

A sample of the dolomite described in Example 1, mixed with 5 wt. % 6 ACA (6-aminocaproic acid) and 0.5 wt. % calcined kaolin was reacted in a rotary furnace at 225° C. for 35 minutes in a hydrogen atmosphere with a hydrogen flow rate of 15 SCFH. The drift spectra of the reacted product showed the presence of amide bonds in the spectra which were not present before the reaction of the dolomite with the 6 ACA in the presence of the calcined kaolin.

EXAMPLE 5

Dolomite as described in Example 1 was reacted with 1% adipic acid plus 1% 1,6 hexanediamine and 0.5% calcined kaolin in a fluidized bed reactor for 30 minutes at 260° C. Drift spectra were obtained on the material before and after reaction of the nylon 6,6 co-monomers on the dolomite surface in the presence of hydrogen. There were amide bonds at wave lengths 3150-3400 $cm^{-1}$ and 1500-1700 $cm^{-1}$ in the spectra of the reacted product which were not evident in the spectra of the unreacted milled dolomite sample.

EXAMPLE 6

A dolomite sample was reacted with 2.5% 11-aminoundecanoic acid as described in Example 1 except that 0.5% $TiO_2$ was substituted for the 0.5% calcined kaolin. The drift spectra of the reacted product showed the formation of amide bands upon reaction with the 11-aminoundecanoic acid.

While the present invention has been particularly set forth in terms of specific embodiments thereof, it will be understood in view of the instant disclosure, that numerous variations upon the invention are now enabled to those skilled in the art, which variations yet reside within the scope of the present teaching. Accordingly, the invention is to be broadly construed, and limited only by the scope and spirit of the claims now appended hereto.

What is claimed is:

1. A method of surface modifying with an organic material a carbonate selected from the group consisting of calcium carbonate, magnesium carbonate and calcium-magnesium carbonate which during processing has become coated with processing chemicals, wherein the carbonate in substantially dry, particulate form is contacted with an organic, co-monomers or a prepolymer, in the presence of gaseous hydrogen and a calcined kaolin or $TiO_2$ as a polymerization catalyst.

2. A method in accordance with claim 1 in which the catalyst is calcined kaolin.

3. A method in accordance with claim 2 in which the carbonate is calcium carbonate.

4. A method in accordance with claim 2 in which the carbonate is dolomite.

5. A method in accordance with claim 2, in which a prepolymer of acrylonitrile/butadiene/styrene is used.

6. A method in accordance with claim 2 in which a monomer selected from the group consisting of 6-amino caproic acid and E-caprolactam is used.

7. A method in accordance with claim 2 in which the carbonate has been processed by grinding the carbonate mineral in the form of an aqueous suspension containing a dispersing agent selected from the group consisting of the sodium, potassium and ammonium salts of polyacrylic acids and polymethacrylic acids whereby the carbonate particles have become coated with said dispersing agent.

8. A particulate carbonate selected from the group consisting of calcium carbonate, magnesium carbonate and calcium-magnesium carbonate, the surfaces of which have been modified by a polymer synthesized in situ in the presence of gaseous hydrogen or by reacting a prepolymer in situ on the carbonate in the presence of gaseous hydrogen, said modified surfaces containing a minor amount of a calcined kaolin.

9. The composition of claim 8 in which the carbonate is calcium carbonate.

10. The composition of claim 8 in which the carbonate is dolomite.

11. A composition comprising a filled polymer system comprising a matrix polymer and a filler, said filler comprising particles of a carbonate selected from the group consisting of calcium carbonate, magnesium carbonate and calcium-magnesium carbonate, the surfaces of which have been modified by a polymer synthesized in situ in the presence of gaseous hydrogen or by reacting a prepolymer in situ on the carbonate in the presence of gaseous hydrogen, said modified surfaces containing a minor, catalytic amount of a calcined kaolin.

12. A composition according to claim 11 in which the in situ synthesized polymer is essentially the same as the matrix polymer.

13. A composition according to claim 11, in which the in situ synthesized polymer is compatible with the matrix polymer.

14. A composition according to claim 11 in which the in situ synthesized polymer is a polyamide.

15. A method of surface modifying with an organic material a carbonate which has been dry ground in the absence of a dispersing agent, said carbonate being selected from the group consisting of calcium carbonate, magnesium carbonate and calcium-magnesium carbonate, wherein the carbonate in substantially dry, particulate form is contacted with an organic monomer, co-monomer or a prepolymer, in the presence of gaseous hydrogen.

16. A method in accordance with claim 15 in which the carbonate is calcium carbonate.

17. A method in accordance with claim 15 in which the carbonate is dolomite.

* * * * *